United States Patent
Wang et al.

(10) Patent No.: US 9,642,016 B2
(45) Date of Patent: May 2, 2017

(54) METHOD AND APPARATUS TO EXTEND THE RANGE OF A BASE STATION IN A MOBILE COMMUNICATION NETWORK

(71) Applicant: Telefonaktiebolaget L M Ericsson (publ), Stockholm (SE)

(72) Inventors: Yi-Pin Eric Wang, Fremont, CA (US); Stephen Grant, Pleasanton, CA (US); Andreas Höglund, Solna (SE); Edgar Ramos, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/418,998

(22) PCT Filed: Jun. 19, 2013

(86) PCT No.: PCT/SE2013/050726
§ 371 (c)(1),
(2) Date: Feb. 2, 2015

(87) PCT Pub. No.: WO2014/021759
PCT Pub. Date: Feb. 6, 2014

(65) Prior Publication Data
US 2015/0208248 A1    Jul. 23, 2015

Related U.S. Application Data

(60) Provisional application No. 61/679,158, filed on Aug. 3, 2012.

(51) Int. Cl.
*H04W 40/00*   (2009.01)
*H04W 16/24*   (2009.01)
(Continued)

(52) U.S. Cl.
CPC .......... *H04W 16/24* (2013.01); *H04B 17/382* (2015.01); *H04L 5/0073* (2013.01);
(Continued)

(58) Field of Classification Search
None
See application file for complete search history.

(56) References Cited

U.S. PATENT DOCUMENTS 7,174,182 B2 *   2/2007   Toono ................... H04W 52/12
                                                             455/522
2005/0130662 A1 *  6/2005  Murai .................... H04J 11/004
                                                             455/444
(Continued)

FOREIGN PATENT DOCUMENTS

EP    2705695 A1    3/2014
WO    2011136334 A1   11/2011
(Continued)

OTHER PUBLICATIONS

Unknown, Author, "Discussions on cell detection issues for FeICIC", Samsung, 3GPP TSG-RAN WG1#69 meeting, R1-122228, Prague, Czech Republic, May 21-25, 2012, 1-3.
(Continued)

*Primary Examiner* — Idowu O Osifade
(74) *Attorney, Agent, or Firm* — Patent Portfolio Builders, PLLC (57) ABSTRACT

There is provided a method for determining an offset to be used to extend the range of a first base station in a mobile communication network, the method comprising determining one or more characteristics of a mobile device; and determining offset to be used to extend the range of the first base station from the one or more characteristics.

14 Claims, 6 Drawing Sheets

(51) Int. Cl.
*H04W 24/02* (2009.01)
*H04B 17/382* (2015.01)
*H04L 5/00* (2006.01)
*H04W 24/10* (2009.01)
*H04W 84/04* (2009.01)
*H04W 88/06* (2009.01)

(52) U.S. Cl.
CPC ........... *H04W 24/02* (2013.01); *H04W 24/10* (2013.01); *H04W 84/045* (2013.01); *H04W 88/06* (2013.01)

(56) References Cited

U.S. PATENT DOCUMENTS

| | | | |
|---|---|---|---|
| 2011/0103499 A1* | 5/2011 | Cheng ............... | H04W 56/0005 375/260 |
| 2012/0188884 A1 | 7/2012 | Simonsson et al. | |
| 2013/0114434 A1* | 5/2013 | Muruganathan ...... | H04W 16/14 370/252 |
| 2013/0244664 A1* | 9/2013 | Song ................. | H04W 36/0083 455/437 |
| 2015/0156694 A1* | 6/2015 | Froberg Olsson .... | H04W 36/30 455/436 |

FOREIGN PATENT DOCUMENTS

| | | |
|---|---|---|
| WO | 2012047144 A1 | 4/2012 |
| WO | 2013141541 A1 | 9/2013 |

OTHER PUBLICATIONS

Unknown, Author, "Meeting minutes for eICIC Ad-Hoc at RAN4 #60", Qualcomm Incorporated, TSG RAN WG4 meeting #60, R4-114834, Athens, Greece, Aug. 22-26, 2011, 1-9.

Unknown, Author, "Reading System Information at 9 dB range extension", Ericsson, ST-Ericsson, 3GPP TSG-RAN WG1 #68bis, R1-121751, Jeju, Korea, Mar. 26-30, 2012, 1-3.

3GPP, "3rd Generation Partnership Project; Technical Specification Group Radio Access Network; Location Measurement Unit (LMU) performance specification; User Equipment (UE) positioning in UTRAN (Release 11)", 3GPP TS 25.111 V11.0.0, Sep. 2012, 1-17.

3GPP, "3rd Generation Partnership Project; Technical Specification Group Radio Access Network; Radio Resource Control (RRC); Protocol specification (Release 10)", 3GPP TS 25.331 V10.7.0, Mar. 2012, 1-1885.

Damnjanovic, Aleksandar et al., "UE's Role in LTE Advanced Heterogeneous Networks", IEEE Communications Magazine, vol. 50, No. 2, Feb. 2012, 164-176.

EP Office Action in application No. 13824845.5 mailed Aug. 4, 2015.

* cited by examiner

Figure 10

METHOD AND APPARATUS TO EXTEND THE RANGE OF A BASE STATION IN A MOBILE COMMUNICATION NETWORK

TECHNICAL BACKGROUND

The invention relates to a mobile communication network, and in particular relates to a method for determining an offset to be used to extend the range of a base station in a mobile communication network and an apparatus configured to implement the same.

BACKGROUND

Heterogeneous networks are an efficient network deployment solution for satisfying the ever-increasing demand of mobile broadband services. In a heterogeneous network, a low- or lower-power node (LPN), for example a picocell, microcell or femtocell base station, is placed in a traffic hot spot within the coverage area of a high- or higher-power node, for example a macrocell base station, to better serve nearby mobile devices. Deploying a low power node in a traffic hot spot may significantly reduce the load in the macro or other higher-power cell covering the area.

Figure 1:
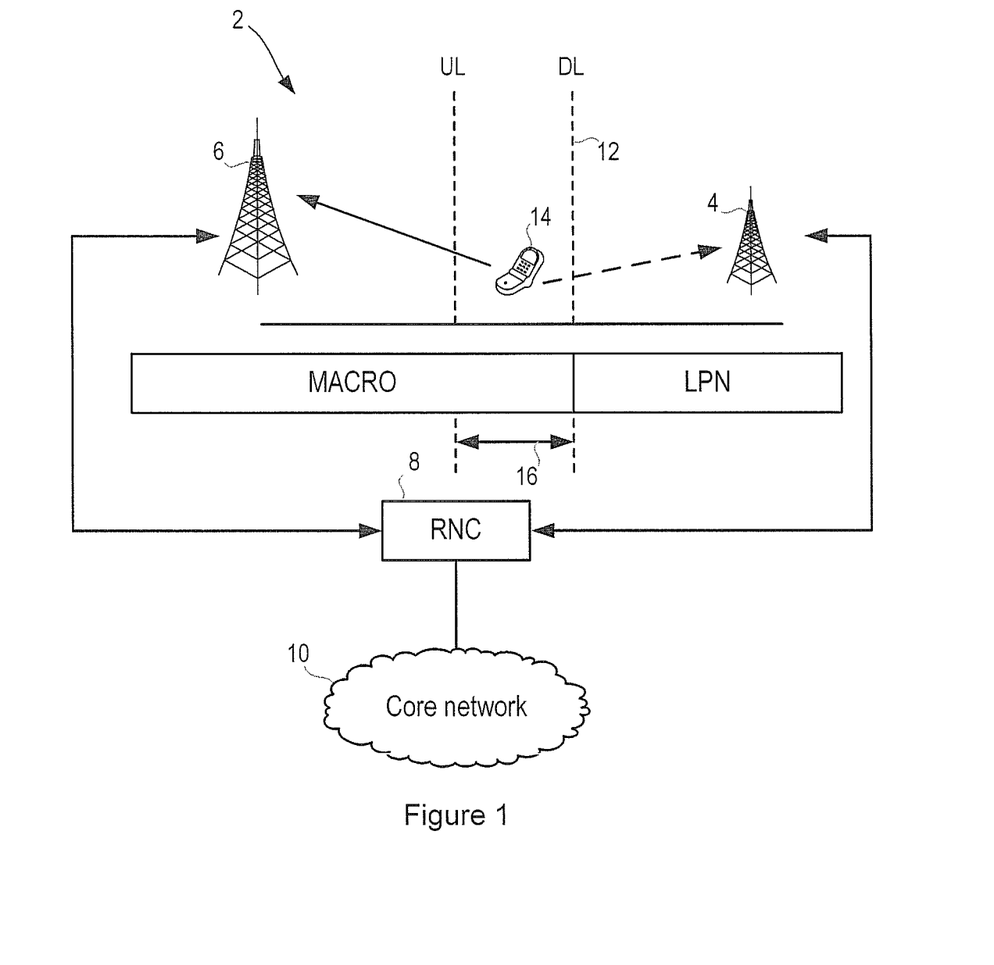
FIG. 1 is an illustration of a network.

The traffic uptake of an LPN however may be somewhat limited. This is due to the transmit power difference between a macro base station (BS) and an LPN. This is illustrated in FIG. 1. In FIG. 1, the network 2 is shown as comprising a low power node 4 (e.g. picocell or microcell base station) placed within the coverage area of a macrocell base station 6. Each of the LPN 4 and macrocell base station 6 are connected to a radio network controller (RNC) 8, which in turn connects to a core network 10. As downlink signal strength or quality is used as a basis for triggering a hand over between base stations, the border 12 of the LPN cell is determined by the downlink (DL) signal strength or quality as measured by a mobile communications device 12 (also known as a user equipment—UE). The border 12 occurs at the point where the downlink signal strength or quality from the LPN 4 is the same as the downlink signal strength or quality from the macrocell base station 6. As the LPN 4 has a much lower transmit power level compared to the macrocell base station 6, the cell border 12 is much closer to the LPN 4 than the macrocell base station 6. However, from the uplink (UL) perspective, the cell border should be somewhere near the equal-distance point between the two base stations 4, 6 since at the equal-distance point the path loss from the UE 14 to both base stations 4, 6 is approximately equal. The region 16 between the UL 'border' and DL border 12 is often referred to as the imbalanced region 16. In the imbalanced region, the UL from the UE 14 would generally be better served by the low-power node 4 (as it is closer to the UE 14 than the macrocell base station 6), but the DL would be better served by the macrocell base station 6.

It is possible for a network operator to 'move' the cell border 12 by employing or adjusting cell selection/reselection or mobility management related parameters. This is referred to as 'range extension'. For example, in a UMTS 3G network, a cell individual offset (CIO) can be used to trigger certain measurement reports that help adjust the cell border for UEs that are in the CELL_DCH state. CIO may be signalled in-band to a UE and thus can be specified for each UE. A UE uses the CIO to bias its mobility measurements (i.e. measurements of the DL signals from the LPN 4 and/or macrocell base station 6). For example, a UE 14 can make use of a weaker cell (i.e. LPN 4 when the UE 14 is in the imbalanced region 16) by applying a large CIO to the measured DL signal quality from the LPN 4. The signal quality can be either the common pilot channel (CPICH) RSCP (received code power) or CPICH Ec/No (energy per chip over noise power spectral density ratio).

Cell selection during the UMTS CELL_FACH state (i.e. the UE has no assigned dedicated radio resource) may be based on CPICH RSCP or CPICH Ec/No measurements, and parameters labelled QOffset1sn (for CPICH RSCP measurements) and QOffset2sn (for CPICH Ec/No measurements) can be used to bias cell selection. There are other cell selection priority parameters that may be used to give a carrier or cell a higher absolute cell selection priority.

Figure 2:
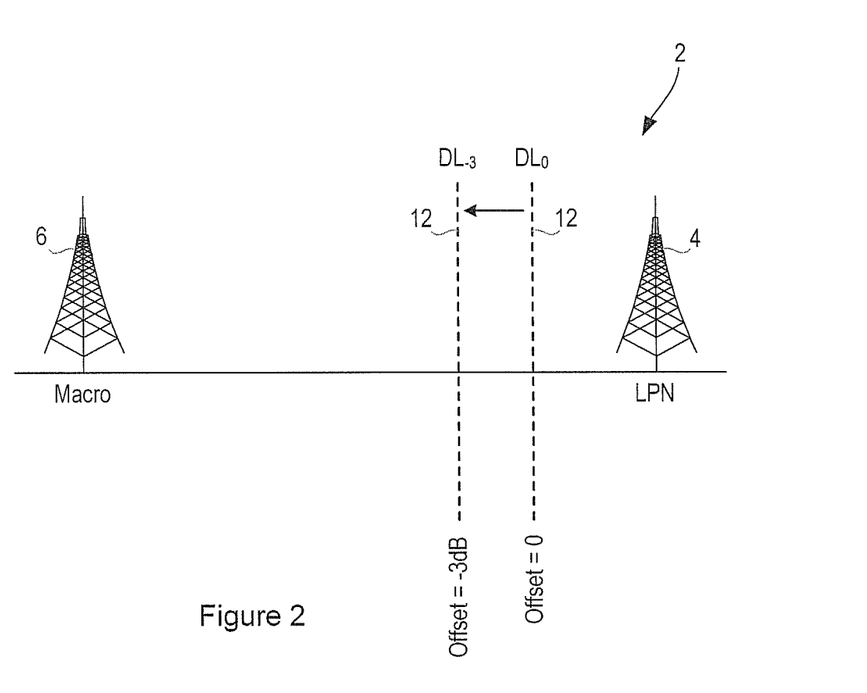
FIG. 2 illustrates the movement of a cell border using an offset value.

Regardless, QOffset1sn, QOffset2sn, or other cell selection priority parameters can be used to adjust the cell border 12 toward, or away from, a neighbouring cell. Both QOffset1sn and QOffset2sn are neighbouring-cell specific (and UE-independent), and thus different values may be used for different neighbouring cells. Each cell broadcasts the QOffset1sn and QOffset2sn values associated with each of its neighbouring cells, and the values of QOffset1sn and QOffset2sn are coordinated among cells that share the same cell border. A UE 14 performs cell selection/reselection based on the QOffset1sn and QOffset2sn values broadcast by the cell it currently camps on.

For example, referring to FIG. 2, if in the cell managed by the LPN 4 the values of QOffset1sn and QOffset2sn associated with the cell managed by macrocell base station 6 are set to be −3 dB, the cell border 12 between the LPN 4 and macrocell base station 6 for UEs being served by the LPN 4 will be moved further from the LPN 4. For UEs being served by the macrocell base station 6, the corresponding values of QOffset1sn and QOffset2sn associated with the LPN 4 will be 3 dB, thus moving the border 12 between the LPN 4 and macrocell base station 6 towards the macrocell base station 6. This coordination allows a consistent cell border 12 to be maintained.

Thus, moving the cell border 12 to increase the traffic uptake of a low-power node 4 is an attractive enhancement for heterogeneous network deployments. However, when the cell border 12 is moved to a point within the imbalanced region 16 (which is usually the case), the DL performance for a UE 14 served by a low-power node 4 may degrade. As noted above, the received DL power from the low-power node 4 in the imbalanced region 16 is weaker than that from the macrocell base station 6. In addition to the desired signal being weaker, the interference from the macrocell DL is also stronger. Poor DL performance may also impact UL performance since the UL data channel (for example, enhanced-dedicated channel—E-DCH) requires reliable DL signalling (e.g. enhanced-absolute grant channel—E-AGCH, enhanced-relative grant channel—E-RGCH and enhanced-DCH hybrid ARQ indicator channel—E-HICH). Poor DL performance may also cause handoff problems when the signalling radio bearer (SRB) is carried by the downlink shared channel (HS-DSCH).

SUMMARY

Therefore, there is a need for an improved way of managing the operation of mobile communication devices (for example the cell selection/reselection operations) that are located in an imbalanced region between two base stations in a network.

As noted above, the level of low-power node cell range expansion depends on a trade-off between offloading traffic from the larger (higher-power) cell (i.e. typically a macrocell base station) and improving uplink (UL) quality versus the reduction in downlink (DL) quality. The specifics of the trade-off may depend on the particular UE. For example, a UE that is capable of mitigating interference from other cells (e.g. a macrocell), can still be served by a low-power node while moving further away from the nominal or normal cell border defined by the DL signal quality, unlike UEs that cannot mitigate inter-cell interference.

Therefore, according to a first aspect, there is provided a method for determining an offset to be used to extend the range of a first base station in a mobile communication network, the method comprising determining one or more characteristics of a mobile device and determining an offset to be used to extend the range of the first base station from the one or more characteristics.

The characteristics of the mobile device can include one or more of the ability or capability of the mobile device to support additional cell range expansion and/or mitigate inter-cell interference in the downlink, which may be represented by, for example, the specific release or standard to which the mobile device complies (for example Release-12 of the 3GPP specifications), the type of receiver or transceiver provided in the mobile device and/or the number of antennas provided in the mobile device.

In some embodiments, the characteristics of the mobile device can additionally or alternatively comprise the speed of movement of the mobile device. In this case, the step of determining an offset can comprise comparing the speed to a threshold value, and setting the offset to a value that extends the range of the first base station by a first amount when the speed is less than the threshold and setting the offset to a value that extends the range of the first base station by a second amount when the speed is greater than the threshold, with the first amount being greater than the second amount. This embodiment is advantageous because a fast-moving mobile device will be less able to mitigate inter-cell interference (since the characteristics of the downlink at the mobile device may change rapidly as the mobile device moves), and also because a fast-moving mobile device will not be within the coverage area of the low-power node for long (whether within the normal cell border of the low-power node or within the extended cell border); in which case it may not be particularly efficient to offload the mobile device to the low-power cell from the higher-power cell.

The second amount can be zero, or a negative value such that the range of the first base station is decreased.

Preferably, an offset is determined to effect a larger range extension of the first base station when the mobile device is considered to be able to mitigate inter-cell interference, and an offset is determined to effect a lower or no range extension when the mobile device is not considered to be able to mitigate inter-cell interference.

In some embodiments, the method is performed in a control node or base station of the network, in which case the step of determining one or more characteristics of the mobile device can comprise receiving an indication of the characteristics of the mobile device from the mobile device.

In these embodiments, the method can further comprise the step of transmitting the determined offset to the mobile device.

These embodiments are suitable for use when the mobile device is in a CELL_DCH state, in which case the determined offset is a Cell Individual Offset.

In alternative embodiments, the method is performed in the mobile device.

In some implementations the step of determining an offset comprises receiving a set of additional offset values from the network, the set of additional offset values comprising one or more additional offset values corresponding to possible characteristics of a mobile device; and selecting an additional offset value from the set according to the determined characteristics of the mobile device.

Alternatively, the method can further comprise, after the step of determining one or more characteristics of the mobile device, the steps of determining an additional offset component to use to extend the range of a base station based on the determined one or more characteristics of the mobile device; and storing the determined additional offset component in a memory module in the mobile device; and wherein the step of determining an offset comprises retrieving the additional offset value from the memory module.

In either case, the step of determining an offset can further comprise receiving an offset component from the network that is to be used by all mobile devices in respect of the first base station; and combining the received offset component and the additional offset value to give the offset to be used by the mobile device to extend the range of the first base station.

The implementations in the previous three paragraphs are suitable for use when the mobile device is in a CELL_FACH state.

In an alternative implementation, the step of determining an offset can further comprise receiving an offset component from the network that is to be used by the mobile device in respect of the first base station; and combining the received offset component and the additional offset value to give the offset to be used by the mobile device to extend the range of the first base station. This implementation is suitable for use when the mobile device is in a CELL_DCH state.

In any of the above implementations, the method in the mobile device can further comprise the steps of measuring the signal quality of downlink signals from the first base station and at least a second base station, the second base station having a higher transmission power than the first base station; applying the determined offset to the measured signal quality for one of the first base station and second base station to give an adjusted signal quality measurement; and using the adjusted signal quality measurement and the measured signal quality for the other one of the first base station and second base station in a cell selection/reselection or mobility management procedure.

The first base station may be a low-power base station, for example a femtocell base station, picocell base station or microcell base station.

According to a second aspect, there is provided a computer program product, comprising computer readable code embodied therein, wherein the computer readable code is configured such that, on execution by a suitable computer or processor, the computer or processor performs any of the methods described above.

According to a third aspect, there is provided an apparatus for use in a mobile communication network, the apparatus comprising a processing module configured to determine one or more characteristics of a mobile device in the network and to determine an offset to be used to extend the range of a first base station in the network based on the one or more characteristics.

The one or more characteristics of the mobile device preferably comprises one or more of the telecommunications standard to which the mobile device complies, the type of receiver or transceiver in the mobile device, the number of antennas in the mobile device and the speed of movement of the mobile device.

In some embodiments, the one or more characteristics represent the ability of the mobile device to mitigate inter-cell interference.

In some embodiments, the processing module is configured to determine an offset to effect a larger range extension of the first base station when the mobile device is considered to be able to mitigate inter-cell interference, and to determine an offset to effect a lower or no range extension when the mobile device is not considered to be able to mitigate inter-cell interference.

In embodiments where the one or more characteristics comprises the speed with which the mobile device is moving, the processing module can be configured to determine an offset by comparing the speed to a threshold value, and setting the offset to a value that extends the range of the first base station by a first amount when the speed is less than the threshold and setting the offset to a value that extends the range of the first base station by a second amount when the speed is greater than the threshold, the first amount being greater than the second amount.

In some embodiments, the processing module can be configured to determine the second amount to be zero or a negative value such that the range of the first base station is decreased.

In certain embodiments, the apparatus is a control node or base station of the network, or is for use in a control node or base station of the network. In these embodiments, the processing module can be configured to determine the one or more characteristics of the mobile device following receipt of an indication of the characteristics of the mobile device from the mobile device.

In some embodiments, the processing module can be configured to transmit the determined offset to the mobile device.

In these embodiments, the mobile device can be in a CELL_DCH state, and the determined offset is a Cell Individual Offset.

In alternative embodiments, the apparatus is the mobile device or is for use in the mobile device.

In these embodiments, the processing module can be configured to determine an offset by receiving a set of additional offset values from the network, the set of additional offset values comprising one or more additional offset values corresponding to possible characteristics of a mobile device; and selecting an additional offset value from the set according to the determined characteristics of the mobile device.

Alternatively, the processing module can be further configured to, after determining one or more characteristics of the mobile device, determine an additional offset component to use to extend the range of a base station based on the determined one or more characteristics of the mobile device; and store the determined additional offset component in a memory module in the mobile device, in which case the processing module can be configured to determine an offset by retrieving the additional offset value from the memory module.

In either case, the processing module can be configured to determine an offset by receiving an offset component from the network that is to be used by all mobile devices in respect of the first base station; and combining the received offset component and the additional offset value to give the offset to be used by the mobile device to extend the range of the first base station.

The above implementations are suitable for use when the mobile device is in a CELL_FACH state.

In alternative implementations, the processing module can be configured to determine an offset by receiving an offset component from the network that is to be used by the mobile device in respect of the first base station; and combining the received offset component and the additional offset value to give the offset to be used by the mobile device to extend the range of the first base station.

The above implementation is suitable for use when the mobile device is in a CELL_DCH state.

In any of the above embodiments, the processing module can be further configured to measure the signal quality of downlink signals from the first base station and at least a second base station, the second base station having a higher transmission power than the first base station; and apply the determined offset to the measured signal quality for one of the first base station and second base station to give an adjusted signal quality measurement; and use the adjusted signal quality measurement and the measured signal quality for the other one of the first base station and second base station in a cell selection/reselection or mobility management procedure.

BRIEF DESCRIPTION OF THE DRAWINGS

Embodiments will now be described, by way of example only, with reference to the following drawings, in which.

DETAILED DESCRIPTION

Although embodiments described below refer to a UMTS mobile telecommunications network, it will be appreciated that the teachings of this application are applicable to other types of network in which nodes of differing transmit power can be deployed. For example, the embodiments can be implemented in an LTE network, in which case the functions of the RNC 8 described below can be performed by another node, for example a serving gateway (S-GW) in the core network 10. Alternatively, in LTE, the network may not need a node like the RNC 8, as neighbouring cells (enhanced NodeBs) can coordinate the offset values between themselves using the X2 interface.

In addition, although the embodiments described below refer to a picocell base station within the coverage area of a macrocell base station, it will be appreciated that the teachings of this application are applicable to any type of heterogeneous deployment of nodes (e.g. a picocell base station within the coverage area of a microcell base station, a microcell base station within the coverage area of a macrocell base station, or a femtocell base station within the coverage area of any of a picocell, microcell or macrocell base station).

As indicated above, the level of low-power node cell range expansion according to the methods described herein depends on the characteristics of the user equipment (UE). In particular embodiments, a UE that is capable of supporting additional cell range expansion and/or mitigating interference from other cells (e.g. a macrocell or other higher-power cell) can still be served by a low-power node outside of the nominal or normal cell border defined by the DL signal quality. Moreover, the better the UE is at mitigating this inter-cell interference, the larger the range extension that can be applied to the low-power cell. Additionally or alternatively, the speed of movement of the UE can be used to adapt the offset applied to signal quality measurements and thus effect a change in the range of the low-power cell for the UE.

Figure 3:
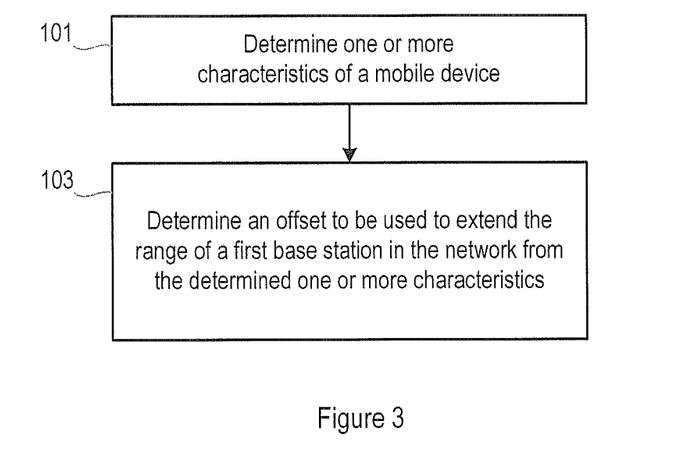
FIG. 3 is a flow chart illustrating a method according to an embodiment.

A method of determining an offset to be used to extend the range of a first base station 4 (i.e. a LPN 4) according to a general embodiment is shown in FIG. 3. In a first step of the method, step 101, one or more characteristics of the mobile device 14 are determined. Then, in step 103, an offset to be used to extend the range of the first base station 4 is determined from the one or more characteristics of the mobile device. As explained in more detail below, this method can be implemented in a UE 14, base station 4, 6 or a network node, such as an RNC 8.

Figure 4:
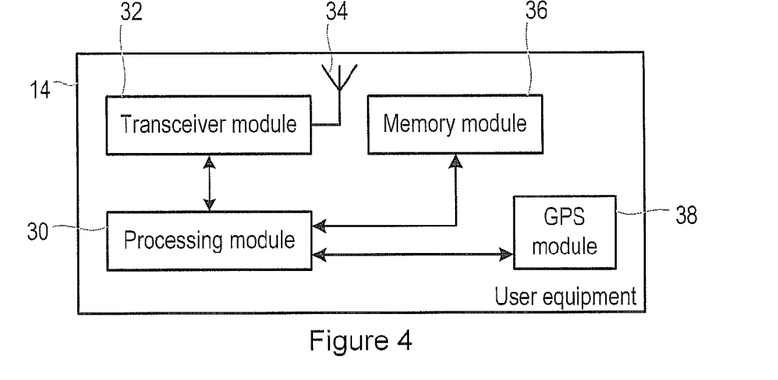
FIG. 4 is a block diagram of a user equipment.

FIG. 4 shows a user equipment 14 that can be used in one or more of the embodiments described below. The UE 14 comprises a processing module 30 that controls the operation of the UE 14. The processing module 30 is connected to a receiver or transceiver module 32 with associated antenna(s) 34 which are used to receive signals from a base station 4, 6 in the network 2. The user equipment 14 also comprises a memory module 36 that is connected to the processing module 30 and that stores information and data required for the operation of the UE 14, including data received from the network 2. In some embodiments, the UE 14 further comprises a satellite positioning system (e.g. GPS) receiver module 38 that can be used to determine the position and speed of movement of the UE 14.

Figure 5:
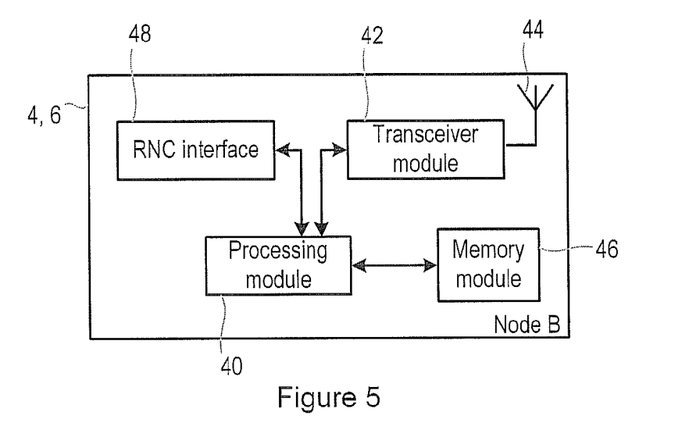
FIG. 5 is a block diagram of a base station.

FIG. 5 shows a base station 4, 6 (called a Node B in UMTS) that can be used in one or more of the embodiments described below. Although in practice the picocell base station 4 will not be identical in size and structure to the macrocell base station 6, for the purposes of this description the base stations 4, 6 are considered to comprise the same components. Thus, the base station 4, 6 comprises a processing module 40 that controls the operation of the base station 4, 6. The processing module 40 is connected to a transceiver module 42 with associated antenna(s) 44 which are used to transmit signals to, and receive signals from, user equipments 14 in the network 2. The base station 4, 6 also comprises a memory module 46 that is connected to the processing module 40 and that stores information and data required for the operation of the base station 4, 6. The base station 4, 6 also includes components and/or circuitry 48 for allowing the base station 4, 6 to exchange information with the RNC 8 (which is typically via the Iub interface).

Figure 6:
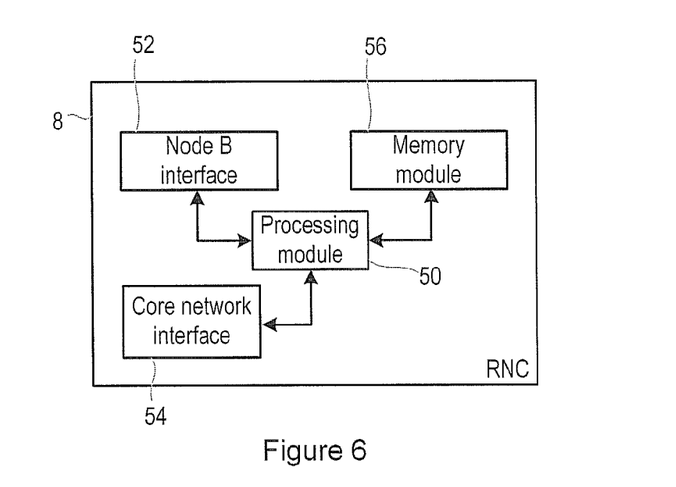
FIG. 6 is a block diagram of a radio network controller.

FIG. 6 shows a radio network controller (RNC) 8 that can be used in one or more of the embodiments described below. The RNC 8 comprises a processing module 50 that controls the operation of the RNC 8. The processing module 50 is connected to components and/or circuitry 52 for allowing the RNC 8 to exchange information with the base stations 4, 6 with which it is associated (which is typically via the Iub interface), and components or circuitry 54 for allowing the RNC 8 to exchange information with the core network 10 (which is typically via the Iu-CS and/or Iu-PS interface). The RNC 8 also comprises a memory module 56 that is connected to the processing module 50 and that stores information and data required for the operation of the RNC 8.

It will be appreciated that only components of the UE 14, Node B 4, 6 and RNC 8 required to illustrate the methods described below are shown in FIGS. 3, 4 and 5.

Figure 7:
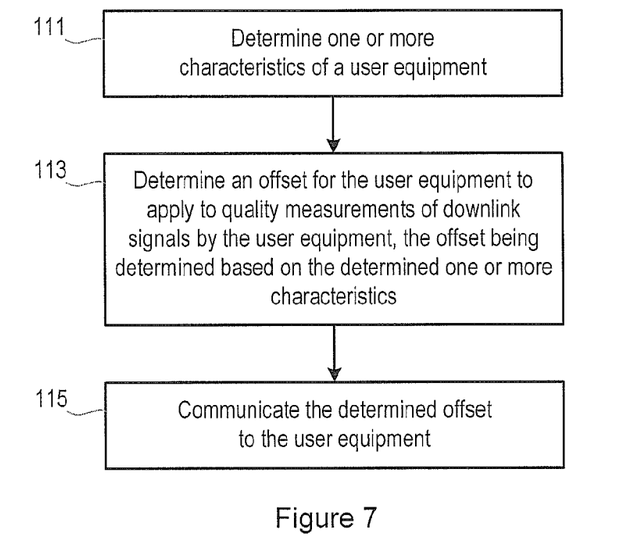
FIG. 7 is a flow chart illustrating a method of operating a radio network controller according to a first specific embodiment.

FIG. 7 illustrates a method according to a first specific embodiment that is performed in the RNC 8 when the relevant UE 14 is in the CELL_DCH state. As indicated above, when the UE 14 is in the CELL_DCH state, a cell individual offset (CIO) is determined for the UE 14 and signalled to the UE 14 by the RNC 8 through the radio resource control (RRC) signalling for the UE 14. In alternative types of network (e.g. LTE), the method in FIG. 7 may be performed by a base station (eNode B) or another node in the network (e.g. S-GW).

In step 111, the node (RNC 8 in the case of UMTS) determines the characteristics of the UE 14. The characteristics can include whether the UE 14 supports additional cell range extension (CRE) for particular cells, which may be represented by, for example, the specific release or standard to which the UE complies (for example Release-12 of the 3GPP specifications), the ability or capability of the UE 14 to mitigate inter-cell interference in the downlink, which may be represented by the type of receiver or transceiver 32 provided in the UE 14 and/or the number and/or type of antennas 34 provided in the UE 14. In some embodiments, the characteristics of the UE 14 additionally or alternatively comprise the speed that the UE 14 is moving. The information about the specific release(s) or standard(s) to which the UE complies can be explicitly signalled to the network (RNC 8) by the UE 14. Similarly, the type of receiver 32 in the UE 14 can be explicitly signalled to the RNC 8. Alternatively, the RNC 8 can infer the capability of the UE 14 in suppressing inter-cell interference through signal quality indicator (CQI) reports sent by the UE 14 to the RNC 8. The speed of the UE 14 can be estimated by a Node B 4, 6 based on variations of channel coefficients associated with the radio link between the UE 14 and Node B 4, 6, and this information passed from the NodeBs to the RNC 8 as part of step 111. Alternatively, the UE 14 can determine or estimate its current speed (e.g. using the satellite positioning system module 38) and can transmit an indication of the speed to the RNC 8.

Then, in step 113, the offset (CIO) to be applied by the UE 14 to measurements of downlink signal quality is determined based on the characteristics of the UE 14. This step can be performed by the processing module 50 in the RNC 8. In general, if the UE 14 supports additional cell range expansion and/or the better the UE 14 is, or is expected to be, at mitigating inter-cell interference, the larger the offset (i.e. the greater the range extension) determined for that UE 14. In embodiments where the speed of movement of the UE 14 is determined, then if the UE 14 is determined to be moving quickly, the offset can be set lower than it otherwise would be to compensate for the reduced ability of the UE 14 to mitigate inter-cell interference while moving at speed. In addition, it may be undesirable to extend the range of the LPN 4 for a fast-moving UE 14 since the UE 14 may not be in range (or the extended range) of the LPN 4 for long enough to justify a handoff (and the associated signalling overhead) to the LPN 4 from the macrocell 6.

As one example, a UE 14 complying with Release 11 (Rel-11) or earlier releases of the 3GPP specification can be considered not to support LPN range extension particularly well due to lack of provisioning in improving reception quality and/or robust downlink signalling, which means that step 113 results in a lower offset value than if the UE 14 was compliant with a later release (e.g. Release 12 (Rel-12)). Thus, step 113 results in a higher offset being determined for a UE 14 compliant with a later release since it is able to support LPN range expansion sufficiently well to operate further from the picocell base station 4 but still be served by the picocell base station 4. It will be appreciated that respective offset values can be defined for each release of the 3GPP specifications, depending on the interference-mitigation and/or CRE-supporting abilities of UEs 14 compliant with those releases. The information about UE conformity to a specific 3GPP release may e.g. be maintained in a database accessible to the plurality of network nodes.

As another example, the offset can be determined based on the type of receiver 32 in the UE 14. In 3GPP 25.111, six receiver types are defined. Type 0 is a conventional RAKE receiver which does not perform channel equalization and does not have receiver diversity; Type 1 is a receiver with receiver diversity but without channel equalization, Type 2 is a linear equalization receiver but without receiver diversity, Type 2i is a linear equalization receiver with interference awareness but without receiver diversity, Type 3 is a linear equalization receiver with receiver diversity, and Type 3i is a linear equalization receiver with receiver diversity and interference awareness. Receiver types 1 and 3 achieve inter-cell interference reduction through coherent combining signals of multiple receive branches. Type 3i receivers are superior to the other types of receivers in suppressing inter-cell interference. Thus, a larger offset can be specified for a UE 14 with a Type 1, 3 or 3i receiver than a UE 14 with a Type 0 or 2 receiver.

It will be appreciated that a combination of the release and type of receiver 32 can be taken into account when determining the offset (CIO).

Where the characteristics of the UE 14 include the speed of movement of the UE 14, the speed of movement of the UE 14 can be determined using, for example, a GPS receiver 38 in the UE 14 and this determined speed communicated to the network 2. Alternatively, the network 2 can estimate the speed of movement of the UE 14 by observing the time-variations of the channel coefficients associated with the radio link between the UE 14 and Node B 4, 6. For example, if the UE's speed of movement is low (e.g. below a threshold), the channel coefficients will vary slowly or stay approximately constant in two consecutive time slots, whereas if the UE's speed of movement is high (e.g. above the threshold), the channel coefficients will vary rapidly and have low correlation between consecutive time slots. The speed of movement can be compared to a threshold value, and if the speed exceeds the threshold value, the offset (CIO) can be set to a lower value (i.e. resulting in lower or less range extension) than when the speed of the UE 14 is less than the threshold value. For example, to prevent a UE 14 that is moving fast towards an LPN 4 from selecting the LPN 4, the offset value (CIO) associated with the LPN 4 can be set to a very small value, e.g. −50 dB. The use of such a small (negative) value can have the effect of reducing the range of the LPN 4 below that provided by conventional methods that extend the range of the LPN 4 using CIO (and even below the conventional DL border 12 if the value for CIO is sufficiently low). This is particularly the case in embodiments where the speed of movement of the UE 14 is the only characteristic determined in step 111. Thus, the effective range of the LPN 4 can be adjusted based on the speed of movement of the UE 14.

Once the offset has been determined in step 113, the determined offset (CIO) is communicated to the UE 14 (step 115). In UMTS networks where the method is performed in the RNC 8, step 115 comprises transmitting the determined offset CIO to the UE 14 in high level signalling (e.g. RRC signalling) through the Iub interface between the RNC 8 and the base station 4, 6 that the UE 14 is connected to (i.e. served by), and to the UE 14 using the transceiver module 42 in the base station 4, 6. In other types of network where the method can be performed in the picocell base station 4 or macrocell base station 6, step 115 can comprise the base station transmitting the determined offset to the UE 14 from that base station 4, 6.

Figure 8:
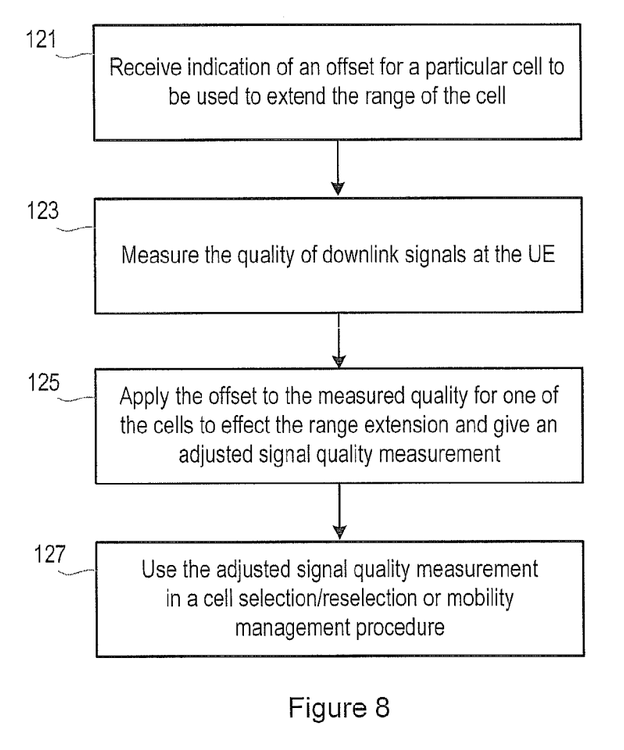
FIG. 8 is a flow chart illustrating a method of operating a user equipment according to the first specific embodiment.

FIG. 8 illustrates a method of operating a user equipment (UE) 14 in accordance with the first embodiment described above. In this embodiment, as indicated above, the UE 14 is in the CELL_DCH state. In step 121, the UE 14 receives an indication of the offset (CIO) to be applied by the UE 14 to signal quality measurements of downlink transmissions to extend the range of a particular cell (e.g. picocell 4) in the network 2. This indication is contained in higher layer signalling (e.g. RRC signalling) sent from the RNC 8 via the base station 4, 6 that is serving the UE 14.

Then, in step 123, the UE 14 measures the quality of downlink signals of any cell from which DL signals can be received at the UE 14. These signals are received from the cell(s) using the receiver or transceiver module 32 and passed to the processing module 30 which determines the signal quality.

In UMTS, the signal quality measurements are measurements of the common pilot channel (CPICH) RSCP (received code power) or CPICH Ec/No from the base station 4, 6 serving the UE 14 and neighbouring cells (such as, for example, the macrocell 6 overlying the picocell 4 when the UE 14 is being served by the picocell 4; or the picocell 4 when the UE 14 is being served by the macrocell 6). The UE 14 then applies the received offset (CIO) for the specified cell to a signal quality measurement to effect an extension of the range of the particular cell (step 125). Again, this step can be performed by the processing module 30.

As described above, it is necessary to maintain a consistent cell border. Thus, where the UE 14 is being served by the macrocell base station 6, the received offset will be for application to the measurement of the signal quality from the picocell base station 4, and step 125 will comprise applying the received offset to the signal quality measurement of the DL from the picocell base station 4 to effectively extend the range of the picocell base station 4. Where the UE 14 is being served by the picocell base station 4, the received offset will be for application to the measurement of the signal quality from the macrocell base station 6, and step 125 will comprise applying the offset to the signal quality measurement of the DL from the macrocell base station 6 to effectively reduce the range of the macrocell base station 6 by the amount of range extension required for the picocell base station 4.

The adjusted signal quality measurement is then used by the UE 14, along with the signal quality measurements for the other cells, in a cell selection/reselection or mobility management procedure (127).

For UEs 14 operating in the CELL_DCH state, the adjusted signal quality measurements are used to trigger the reporting of certain soft handoff (SHO) events by the UE 14 to the RNC 8. The measurement reports sent to the RNC 8 when these events occur are used by the RNC 8 to determine which cell or cells should be active or serve the UE 14. The measurement reports can contain the (unadjusted) signal quality measurements made by the UE 14 on the signals from the picocell base station 4 and macrocell base station 6, or the signal quality measurements after the offset has been applied. In either case, the RNC 8 will know in advance whether the measurement report contains the unadjusted or adjusted signal quality values.

Figure 9:
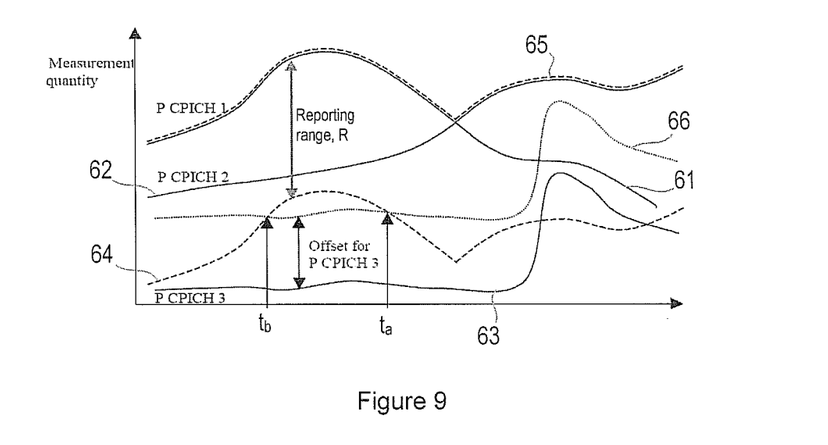
FIG. 9 is a graph illustrating the triggering of reporting events when a user equipment is operating in a CELL_DCH state.

For UMTS, the events are defined in section 10.3.7.39 of "Radio Resource Control (RRC) Protocol specification", version 10.7.0, Release 10, March 2012. The events 1*a* and 1*b* discussed below are:

Event 1*a*—A Primary CPICH enters the Reporting Range
Event 1*b*—A Primary CPICH leaves the Reporting Range FIG. 9 illustrates when events 1*a* and 1*b* might be triggered. FIG. 9 shows measurements of the quality of the CPICH from three cells, Cell_1, (line 61), Cell_2 (line 62) and Cell_3 (line 63), as measured by a UE 14 over a period of time. Cell_1 and Cell_2 are active cells for the UE 14 (i.e. the UE 14 has active DL connections with both cells). A reporting range R is defined that is used to determine the triggering of SHO events 1*a* and 1*b*. Any signals from other cells (e.g. Cell_3, which may be a LPN 4) that enter or leave the reporting range R (the lower edge of which is represented by dashed line 64) from the maximum measured quality of the two active cells (shown by dashed line 65) trigger SHO events 1*a* and 1*b* respectively. As an offset is applied to the quality measurement of the CPICH from Cell_3 (with the adjusted signal quality measurement being represented by line 66), it can be seen that an SHO event 1*b* will be triggered at time $t_b$ and an SHO event 1*a* will be triggered at time $t_a$.

When an SHO event 1*a* is triggered for Cell_3, the measurement reports sent by the UE 14 to the RNC 8 will thereafter include the original (unadjusted) or adjusted signal quality measurement (as appropriate) for Cell_3. However, when SHO event 1*b* is triggered for Cell_3, the original or adjusted signal quality measurement (as appropriate) for Cell_3 will no longer be included in the measurement reports sent to the RNC 8.

Triggering event 1*a* for a new cell, for example a picocell or a microcell, allows the network (i.e. RNC 8) to acquire the downlink signal quality measurement information on the new cell, and allows the RNC 8 or other node in the network 2 to decide whether to add the new cell to the active cell, or even to make the new cell the serving cell (when certain criteria are met).

A further consideration for a UE 14 in the CELL_DCH state is UL interference. If a UE 14 is generating high UL interference at the macrocell base station 6 and/or picocell base station 4, the network may determine and use an appropriate CIO value for a closer LPN 4 to encourage such a UE 14 to be handed over to the closer low-power node 4.

Figure 10:
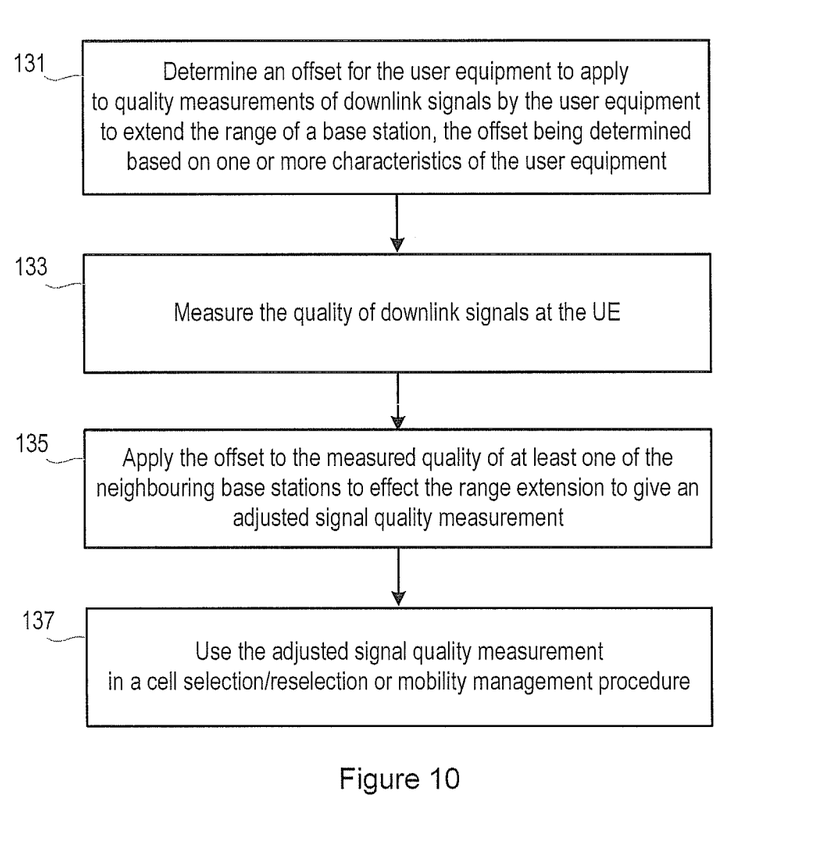
FIG. 10 is a flow chart illustrating a method of operating a user equipment according to a second specific embodiment.

A method of operating a user equipment according to a second specific embodiment is shown in FIG. 10. This embodiment is primarily applicable to UEs 14 that are operating in the CELL_FACH state. In this state, the UE 14 is camped on a particular cell (e.g. the cell served by the picocell base station 4 or macrocell base station 6). As indicated above, when a UE 14 is in the CELL_FACH state, an offset value (QOffset1sn and/or QOffset2sn) for a particular cell is broadcast by its neighbours for use by all UEs 14 in adjusting signal quality measurements of that cell. Thus, the picocell base station 4 broadcasts a neighbour-cell specific QOffset value for each of its neighbour cells, including the macrocell base station 6, for use by UEs that are camped on the picocell base station 4. Likewise, the macrocell base station 6 broadcasts a neighbour-cell specific QOffset value for each of its neighbour cells, including the picocell base station 4, for use by UEs that are camped on the macrocell base station 6. As noted above, the QOffset values for the picocell base station 4 and the macrocell base station 6 will be coordinated to maintain a consistent cell border between the base stations 4, 6. The offset value can be broadcast in the P-CCPCH (Primary-Common Control Physical Channel) from a base station 4 or 6 to the UEs 14.

Briefly, in this embodiment, as the offset provided by the network when the UE 14 is in the CELL_FACH state is not specific to a particular UE (it is only cell-specific, i.e. it is applied by all UEs to that cell), the determination of at least an additional offset component to be applied to signal quality measurements to extend the range of a particular cell is performed by the UE 14, rather than by a node 4, 6, 8 in the network 2 as in the first embodiment.

Thus, in step 131, the processing module 30 in the UE 14 determines an offset for the UE 14 to apply to a signal quality measurement of downlink signals by the UE 14 to extend the range of a LPN 4 based on one or more characteristics of the UE 14. As in the first embodiment, the one or more characteristics of the UE 14 can comprise, for example, the specification release with which the UE 14 complies, the type of receiver 32, the number of antennas 34 and/or the speed of movement of the UE 14.

As indicated above, in the CELL_FACH state, an offset value to be applied to a particular cell is broadcast for all UEs 14 to use. In some implementations of the second embodiment, the network (for example the base stations 4 or 6) can be configured to broadcast a set of one or more additional offset components from which a UE 14 can select the appropriate additional offset component based on its characteristics to be applied by a UE 14 to its measurements of the quality of the DL signals from the cell. The additional offset component can comprise a single additional value that is to be used by a UE 14 that meets the required criteria (i.e. has a certain characteristic or set of characteristics) or respective offset components for different possible characteristics of the UE 14. In this implementation, step 131 comprises the UE 14 receiving the broadcast offset value for a cell (e.g. QOffset1sn and/or QOffset2sn) and the additional offset value(s) for possible characteristics of UEs (denoted QOffset1sn_extra and/or QOffset2sn_extra). The UE 14 then determines its particular characteristics and selects the appropriate value of the additional offset to use from the broadcast set. Information on the characteristics of the UE 14 may be stored in the memory module 36 of the UE 14.

Where an additional offset is broadcast that is applicable to the UEs which comply with a later specification release, e.g., Release 12 (Rel-12), a UE 14 complying with Release 11 (Rel-11) or earlier should discard or ignore such an additional offset. This means that there is no additional range extension of the picocell base station 4 for this UE 14. In contrast, a UE 14 conforming to Release 12 (Rel-12) or later can be considered to support LPN range expansion sufficiently well that it can operate further from the picocell base station 4 than earlier-release UEs. This means that the broadcast QOffset1sn_extra(n) and/or QOffset2sn_extra(n) can be applied to effectively extend the range of the picocell base station 4 beyond that specified by QOffset1sn(n) or QOffset2sn(n). Alternatively, respective values of QOffset1sn_extra(n) and/or QOffset2sn_extra(n) can be set for each release with which a UE 14 can comply and can be broadcast by the network 2 to any UEs camping on the LPN 4. The UE 14 can then select the appropriate extra offset based on its characteristics. For example, the extra offset to be applied when a UE 14 conforms with Release 12 (Rel-12) could have a value represented by QOffset1sn_Rel12(n).

Where the an additional offset is broadcast that is applicable to specific types of receiver 42, e.g., Type 1 or 3, a UE 14 with a Type 0 or 2 receiver should discard or ignore the additional offset value, whereas a UE 14 with a Type 1 or 3 receiver can apply the additional offset value that extends the range of the picocell base station 4 beyond the normal range extension. The network may broadcast a different, higher, additional offset value to be applicable to UEs with a Type 3i receiver, and a UE 14 with a Type 3i receiver can apply such an additional offset value to extend the range of the picocell base station 4 further still. The extra offset to be applied when a UE 14 comprises a Type 3i receiver, for example, could be represented by QOffset2sn_Type3i.

Where the speed of movement of the UE 14 is taken into account in determining the offset in step 113, the speed of movement can be compared to a threshold value. If the speed exceeds the threshold value, then the range of the LPN 4 can be reduced as the UE 14 is moving too fast. In some embodiments, this means that any broadcast additional or extra offset resulting from the type of receiver 32, number of antennas 34 or the specification release to which the UE 14 complies can be ignored or discarded by the UE 14, which means that no additional range extension is applied to the LPN 4. It will be appreciated that this can alternatively be implemented by the network broadcasting an additional offset value for the speed, s, of movement of the UE 14 that negates (or at least partially negates) the additional offset provided by the other characteristics of the UE 14. For example:

$$Qoffset1sn\_speed=-QOffset1sn\_extra(n) \quad (3)$$

$$Qoffset2sn\_speed=-QOffset2sn\_extra(n) \quad (4)$$

where Qoffset1sn_speed and Qoffset2sn_speed are the additional offset components based on the speed of the UE 14 for CPICH RSCP and Ec/No respectively. Alternatively, a very small value, e.g., −50 dB, can be set for Qoffset1sn_speed and Qoffset2sn_speed to effectively prevent the UE 14 from selecting the cell served by the LPN 4. The use of such a small (negative) value can have the effect of reducing the range of the LPN 4 below that provided by conventional methods that extend the range of the LPN 4 using QOffset1sn and QOffset2sn (and even below the conventional DL border 12 if the value for Qoffset1sn_speed and Qoffset2sn_speed is sufficiently low). This is particularly the case in embodiments where the speed of movement of the UE 14 is the only characteristic determined in step 131. Thus, the effective range of the LPN 4 can be adjusted based on the speed of movement of the UE 14.

Where the speed s is less than the speed threshold, any specified value for Qoffset1sn_speed and Qoffset2sn_speed can be discarded or ignored by the UE.

Alternatively, the range can be further extended when the speed is less than the threshold, by the network broadcasting another additional offset value to be used by UEs 14 travelling sufficiently slowly.

The speed of movement of the UE 14 can be determined in step 131 using the satellite positioning system module 38 of the UE 14 to measure the change in position of the UE 14 over time and output an estimate of the speed of movement of the UE 14 to the processing module 30. This speed can be compared to a threshold, and, where the speed exceeds a threshold, the extra offset for the UE 14 can be determined to be zero (e.g. any other additional offset ignored), regardless of the CRE capability or inter-cell interference mitigation capability of the UE 14. In further embodiments, where the speed exceeds the threshold, the UE 14 can use an extra offset component that has the effect of reducing the range of the LPN 4 when compared to other UEs (e.g. those using QOffset1sn).

In an alternative implementation of the second embodiment, an appropriate value or possible values for the extra offset component for the UE 14 can be determined from the characteristics of the UE 14 and stored in the memory module 36 of the UE 14, thereby avoiding the need for the base station 4, 6 to broadcast a set of additional offset components to the UEs. In this case, step 131 can comprise receiving the broadcast offset value for a cell (e.g. QOffset1sn) and combining it with an appropriate additional offset value(s) retrieved from the memory module 36 of the UE 14 to give the offset value the UE 14 is to apply to downlink signal quality measurements to extend the range of the LPN 4.

Once the offset for a particular LPN 4 has been determined, the quality of any downlink signals that can be received at the UE 14 is measured (step 133), the determined offset applied to one of the signal quality measurements to effect the range extension of the LPN 4 to give an adjusted signal quality measurement (step 135) and the adjusted signal quality measurement used in a cell selection/reselection or mobility management procedure (step 137). Steps 133 and 135 correspond generally to steps 123 and 125 described above.

For UEs 14 operating in the CELL_FACH state, cell selection/reselection is initiated by the UE 14 based on the quality of the common pilot channel (CPICH) received from the base station 4, 6 serving the UE 14 and neighbouring cells. So, in step 133 the UE 14 measures the CPICH RSCP (received code power) or CPICH Ec/No from cell n (when the UE 14 is camped on another cell). The determined offset is then applied to the quality measurement in step 135 to obtain the adjusted signal quality measurement and effectively extend the range of cell n.

A conventional cell selection/reselection metric associated with cell n can be formulated as follows:

$$CPICH\_RSCP(n)+QOffset1sn(n) \quad (1)$$

$$CPICH\_Ec\_No(n)+QOffset2sn(n) \quad (2)$$

where QOffset1sn(n) is the offset applied to the CPICH RSCP quality measurement for cell n, CPICH_RSCP(n), and QOffset2sn(n) is the offset applied to the CPICH Ec/No quality measurement for cell n, CPICH_Ec_No(n),In a heterogeneous network, positive values of QOffset1sn(n) and QOffset2sn(n) extend the coverage area of a node n, and negative values effectively reduce the coverage area.

However, in the second embodiment, when the UE 14 is in the CELL_FACH state, the additional offset component (denoted QOffset1sn_extra(n) and QOffset2sn_extra(n)) is determined by the UE 14 in step 131 (either by retrieving a stored offset value from the memory module 36 or by selecting the extra offset appropriate for the characteristics of the UE 14 from a set of possible extra offset values broadcast by the network 2 to all UEs 14 that are camping on the cell 4) that is to be applied by the particular UE 14 to measurements of the DL signal quality of the picocell base station 4 (when the UE 14 is being served by the macrocell base station 6) in addition to the 'normal' offset, QOffset1sn(n) and QOffset2sn(n). Thus, the metric used in cell selection/reselection according to the second embodiment (step 137) can be given by:

$$CPICH\_RSCP(n)+QOffset1sn(n)+QOffset1sn(n)\_extra \quad (3)$$

$$CPICH\_Ec\_No(n)+QOffset2sn(n)+QOffset2sn(n)\_extra \quad (4)$$

In an alternative implementation to that described above, where the additional offset component determined for the UE 14 in step 131 is determined, at least in part, on the basis of the specification release with which the UE 14 complies, the relevant additional offset component can be communicated to the UE 14 using signalling or a channel specified in a particular release that is not found in earlier releases. In this way, it is ensured that only those UEs 14 complying with the most recent release(s) can receive and apply that additional offset.

As in the first embodiment, the offset value used in step 137 needs to be coordinated for neighbouring cells in order to maintain a consistent cell border. So, where the total offset to be applied to measurements of signal quality from picocell 4 when the UE 14 is being served by the macrocell 6 might be determined to be 'x', a corresponding total offset value of '−x' will be determined by the UE 14 in step 131 for use when the UE 14 is being served by the picocell 4, with the value of −x being applied by the UE 14 to measurements of signal quality from the overlying macrocell 6.

In the second embodiment above, although each low-power node 4 may have a respective 'normal' offset value (e.g. QOffset1sn) to be applied to DL signal quality measurements, the additional offset value to be applied for a specific UE characteristic (e.g. QOffset1sn_extra(n)) can be the same for all neighbouring cells for the UE 14 that are classified as low-power nodes 4. The UE 14 can identify those nodes 4, 6 that are low-power through the information typically broadcast from the nodes 4, 6 indicating, for example, their transmit power. Alternatively, however, where the additional offset values are specified in broadcasts by the network 2, different additional offset values for particular characteristics of the UE 14 can be determined for each low-power node 4.

Although it has been noted above that the second embodiment is primarily for use with UEs 14 that are in the CELL_FACH state, it will be appreciated that it can also be applied to UEs 14 that are in the CELL_DCH state. In this case, the RNC 8 can determine and transmit a cell individual offset (CIO) value to the UE 14 in a conventional manner, and the UE 14 can determine an additional offset component for the CIO (e.g. CIO_extra) according to its characteristics (e.g. release type, receiver type, etc.). This additional offset component can be predetermined and stored in the memory module 36 of the UE 14.

There is therefore provided an improved way of managing the operation of mobile communication devices (for example the cell selection/reselection and mobility management operations) that are located in an imbalanced region between two base stations in a network.

It will be appreciated that the base stations 4, 6, RNC 8 and/or UE 14 can be configured to implement the methods described above using suitable software or firmware, or by providing the base station 4, 6, RNC 8 and/or UE 14 with a suitably configured processor, processing module, application-specific integrated circuit (ASIC), field-programmable gate array (FPGA), etc.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed in a mobile device of a mobile communication network for determining an offset to be used to extend a range of a first base station in the mobile communication network, the method comprising:
    receiving, by a receiver of the mobile device, an offset component from the mobile communication network that is to be used by all mobile devices in respect of the first base station;
    determining, by a processor of the mobile device, one or more characteristics of the mobile device operating in the mobile communication network;
    receiving, by the receiver of the mobile device, a set of additional offset values from the mobile communication network, the set of additional offset values comprising one or more additional offset values corresponding to the one or more characteristics of the mobile device;
    selecting, by the processor of the mobile device, an additional offset value from the set of additional offset values based on the one or more characteristics of the mobile device; and
    determining, by the processor of the mobile device, the offset to be used by the mobile device to extend the range of the first base station in the mobile communication network by combining the offset component and the additional offset value.

2. The method as claimed in claim 1, wherein the one or more characteristics of the mobile device comprise one or more of a telecommunications standard to which the mobile device complies, a type of receiver or transceiver in the mobile device, a number of antennas in the mobile device, and a speed of movement of the mobile device.

3. The method as claimed in claim 1, wherein the one or more characteristics represent an ability of the mobile device to mitigate inter-cell interference.

4. The method as claimed in claim 3, wherein the step of determining, by the processor of the mobile device, the offset comprises determining an offset to effect a larger range extension of the first base station when the mobile device is considered to be able to mitigate inter-cell interference, and determining an offset to effect a lower or no range extension when the mobile device is not considered to be able to mitigate inter-cell interference.

5. The method as claimed in claim 1, wherein the one or more characteristics comprises a speed with which the mobile device is moving, and the step of determining, by the processor of the mobile device, the offset comprises comparing the speed to a threshold value, and setting the offset to a value that extends the range of the first base station by a first amount when the speed is less than the threshold value and setting the offset to a value that extends the range of the first base station by a second amount when the speed is greater than the threshold value, the first amount being greater than the second amount.

6. The method as claimed in claim 5, wherein the second amount is zero or a negative value such that the range of the first base station is decreased.

7. The method as claimed in claim 1, the method further comprising:

after the step of determining, by the processor of the mobile device, the one or more characteristics of the mobile device, the steps of:
  determining an additional offset component to use to extend the range of the first base station based on the determined one or more characteristics of the mobile device; and
  storing the additional offset component in a memory module in the mobile device, and
  wherein the step of determining, by the processor of the mobile device, the offset comprises retrieving the additional offset component from the memory module.

8. The method as claimed in claim 7, wherein the step of determining, by the processor of the mobile device, the offset further comprises combining the offset component and the additional offset component to give the offset to be used by the mobile device to extend the range of the first base station.

9. The method as claimed in claim 1, wherein the method in the mobile device further comprises the steps of:
  measuring signal quality of downlink signals from the first base station and at least a second base station, the second base station having a higher transmission power than the first base station;
  applying the offset to the measured signal quality for one of the first base station and second base station, to give an adjusted signal quality measurement; and
  using the adjusted signal quality measurement and the measured signal quality for the other one of the first base station and second base station in a cell selection or mobility management procedure.

10. A non-transitory computer-readable medium storing a computer program product, comprising computer readable code embodied therein, said computer program product including program instructions that, when executed by a processing circuit of a mobile device in a mobile communication network, extends a range of a first base station in the mobile communication network, based on configuring the mobile device to:
  receive, by a receiver of the mobile device, an offset component from the mobile communication network that is to be used by all mobile devices in respect of the first base station;
  determine, by the processing circuit of the mobile device, one or more characteristics of the mobile device operating in the mobile communication network;
  receive, by the receiver of the mobile device, a set of additional offset values from the mobile communication network, the set of additional offset values comprising one or more additional offset values corresponding to the one or more characteristics of the mobile device;
  select, by the processing circuit of the mobile device, an additional offset value from the set of additional offset values based on the one or more characteristics of the mobile device; and
  determine, by the processing circuit of the mobile device, an offset to be used by the mobile device to extend the range of the first base station in the mobile communication network by combining the offset component and the additional offset value.

11. An apparatus for use in a mobile communication network, the apparatus comprising a processing circuit configured to:
  receive, by a receiver of the apparatus, an offset component from the mobile communication network that is to be used by all mobile devices in respect of a first base station;
  determine one or more characteristics of a mobile device operating in the mobile communication network;
  receive, by the receiver of the apparatus, a set of additional offset values from the mobile communication network, the set of additional offset values comprising one or more additional offset values corresponding to the one or more characteristics of the mobile device;
  select an additional offset value from the set of additional offset values based on the one or more characteristics of the mobile device; and
  determine an offset to be used by the mobile device to extend a range of the first base station in the mobile communication network by combining the offset component and the additional offset value.

12. The apparatus as claimed in claim 11, wherein the one or more characteristics of the mobile device comprise one or more of a telecommunications standard to which the mobile device complies, a type of receiver or transceiver in the mobile device, a number of antennas in the mobile device, and a speed of movement of the mobile device.

13. The apparatus as claimed in claim 11, wherein the one or more characteristics represent an ability of the mobile device to mitigate inter-cell interference.

14. The apparatus as claimed in claim 11, wherein the apparatus is the mobile device.

* * * * *